Aug. 10, 1948.

L. A. SKINNER 2,446,560

ROCKET CHARGE SUSPENSION ARRANGEMENT

Filed Sept. 19, 1941

Inventor
Leslie A. Skinner
By
Attorneys

Aug. 10, 1948.   L. A. SKINNER   2,446,560
ROCKET CHARGE SUSPENSION ARRANGEMENT
Filed Sept. 19, 1941   2 Sheets-Sheet 2
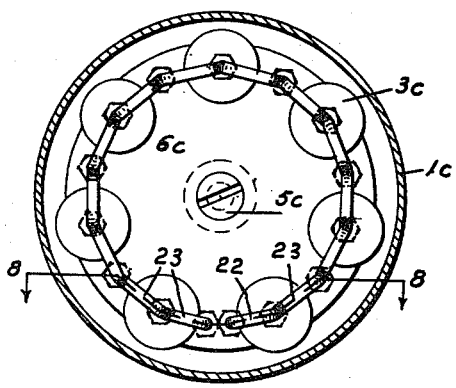
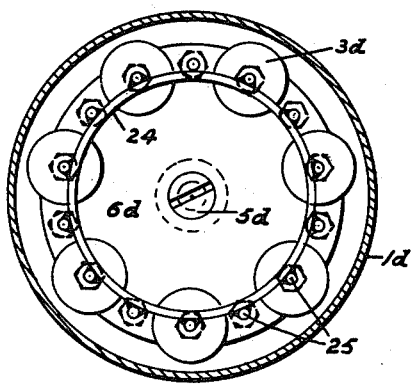
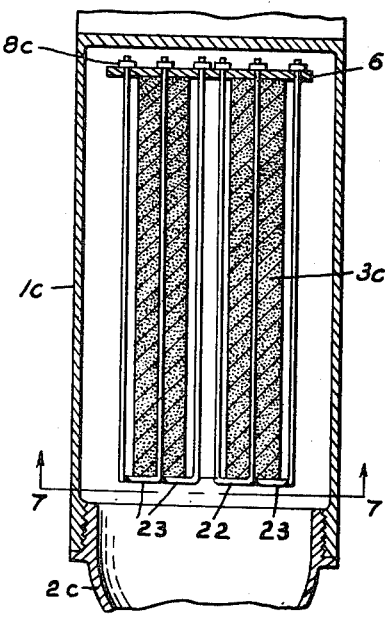
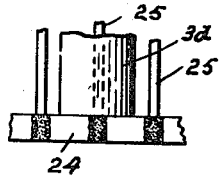
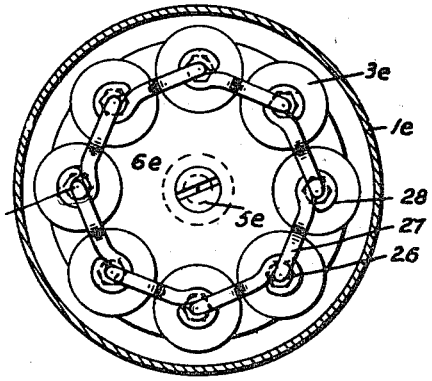
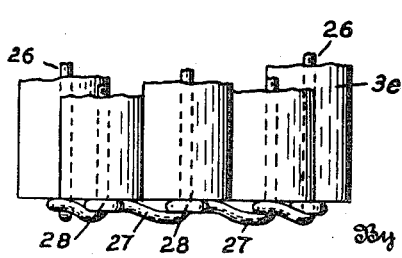
Inventor
Leslie A. Skinner Patented Aug. 10, 1948

2,446,560

UNITED STATES PATENT OFFICE 2,446,560

ROCKET CHARGE SUSPENSION ARRANGEMENT

Leslie A. Skinner, United States Army, Washington, D. C., assignor to the United States of America as represented by the Secretary of War Application September 19, 1941, Serial No. 411,512

20 Claims. (Cl. 60—35.6)

(Granted under the act of March 3, 1883, as amended April 30, 1928; 370 O. G. 757)

The invention described herein may be manufactured and used by or for the Government for governmental purposes, without the payment to me of any royalty thereon.

This invention relates to a rocket and more specifically to a new means of suspending a charge in a rocket body.

In the rockets of the prior art where a slow burning charge is used it has been customary to form in the driving charge an elongated conical gallery for the purpose of offering a relatively large surface for combustion. It has also been believed to be essential generally in powder propelled rockets that the charge be sealed to the walls of the body to secure an intimate contact between the charge and the walls of the body which prevented the flame from getting between charge and body with a probable irregular increase of pressure. The loading of such rockets of the prior art has required a considerable amount of skilled hand work with the usual variability in results due to the human factor involved.

It is therefore an object of this invention to increase the facility with which rockets may be manufactured and loaded. I have discovered that the intimate contact of the charge and chamber wall above referred to are not essential, and it is my aim to present a novel arrangement for mounting the charge in a rocket in which the burning rate of the propellant is proportionate to the force essential for propulsion of the projectile over a substantial part of its flight, and to use a chamber of light weight incapable of withstanding high pressures.

In the loading of rockets, it is important that means be provided which make it possible to accurately control the relationship between the area of the burning charge, the volume of combustion space available, and the area of the orifice.

It is a further object of this invention to produce a driving charge for a rocket which may be preformed to the desired dimensions and density in such a manner that loading in a rocket body may be accomplished by unskilled labor, and even under field conditions, without disturbing the desired relation between burning area and chamber volume. In this way accurately controlled and uniform burning characteristics will be assured.

In the employment of prior military rockets, particularly as projectiles, the initial acceleration applied to the rocket body is sometimes so great as to cause a partial or complete disruption of the charge in the driving chamber. In such a case the resultant choking of the discharge tube with fragments of unburned composition interferes with the propulsion and may produce a rise in pressure sufficient to burst the chamber. It is of great importance that the driving charge of the rocket be positively supported in the chamber against the forces of setback acting during the acceleration of the rocket body.

It is therefore a further object to provide means for positively supporting the charge within the driving chamber, the said means being characterized by light weight, ease of loading, simplicity, positive action, and freedom from interference with the normal flow of gases to the discharge tube or nozzle.

The specific nature of the invention as well as other objects and advantages thereof will clearly appear from the description of a preferred embodiment as shown in the accompanying drawings in which:

Figure 7 is a cross section on the line 7—7 of Figure 8 illustrating a modified form of my invention.

Figure 8 is a longitudinal section on the line 8—8 of Figure 7.

Figure 9 is a cross section taken in the same plane as Figure 7 illustrating another embodiment.

Figure 10 is a side elevation of a fragment of the lower portion of the charge supporting means shown in Fig. 9.

Figure 11 is a cross section taken in the same plane as Figure 7 illustrating another modification.

Figure 12 is a side elevation of part of the charge supporting means and supported charge units shown in Figure 11.

Figure 1:
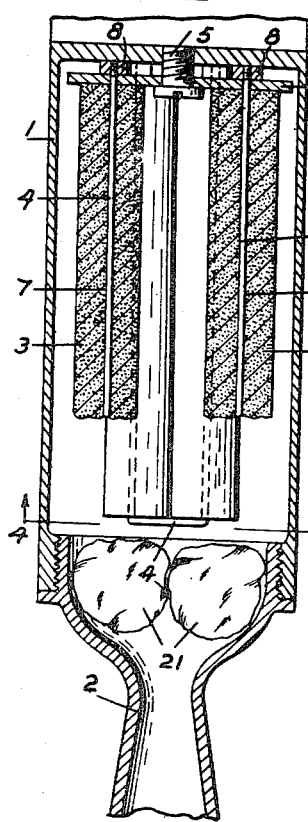
Figure 1 is a longitudinal sectional view of the driving charge chamber of a rocket embodying one form of my invention, two of the charge units being broken to more clearly show those in rear of the broken units.

Referring to the drawings by characters of reference there is shown in Figure 1 a portion of a rocket body adapted to carry in its front portion a parachute flare, bursting charge or other device. The portion of the rocket body shown comprises a charge chamber or motor chamber 1 enclosing the driving charge, and a discharge tube or nozzle 2 forming a combustion chamber of predetermined volume in rear of the charge. The volume of the combustion chamber and distance of the orifice of the nozzle from the charge are adjustable by means of screwing the discharge tube in or out of the body. In some cases it may be desirable to use shims or gaskets in this joint. The driving charge comprises a plurality of molded units 3 of driving charge composition in the form of sticks, each having an axial perforation 7 for its full length. Secured to the front wall of the charge chamber by an assembly screw stud 5 or other convenient means is a retaining plate 6. In the modification shown in Figure 1 a plurality of the units 3 of the molded composition are secured in the chamber 1 against setback by means of light weight U-bolts or rods 4 or tension members, inserted lengthwise through the perforations of a pair of units and having their extremities projecting through holes in the plate 6 and retained therein by nuts 8 on the bolts engaging the front face of the plate. This plate may be considered the forward boundary or terminal wall of the chamber. The bight portions of the U-bolts are rectilinear and may be considered as heads on the U-bolts. The nuts also may be considered as equivalents of heads, serving in fact the function of attachable heads for the same purpose as the integral heads, and includable under the term "heads" as used in the claims.

Figure 4:
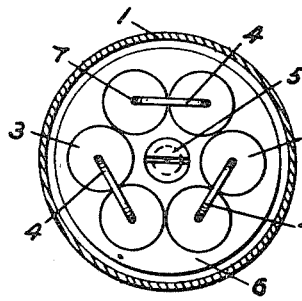
Figures 4 and 5 are cross sections on the line 4—4 of Figure 1 showing the device of Figure 1 with respective different styles of loading.
Figure 5:
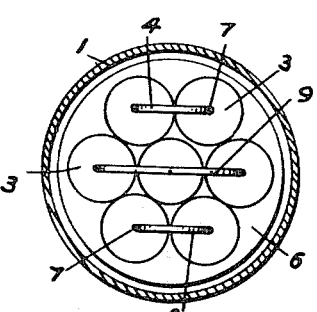
Figure 6:
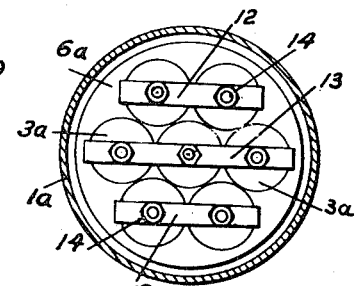
Figure 6 is a similar view on the line 6—6 of Figure 2 of the modification shown in Figure 2.

Figure 4 shows the method of using three U-bolts 4 to secure a charge of six units to the retaining plate 6. As shown in Figure 5 a wide based U-bolt 9 may be used to secure a pair of diametrically opposite charge units in which case a seventh unit may be retained by engagement with the base or bight of the same U-bolt 9. Obviously, other variations in the exact arrangement of the units of charge are within the limits of my invention.

Figure 2:
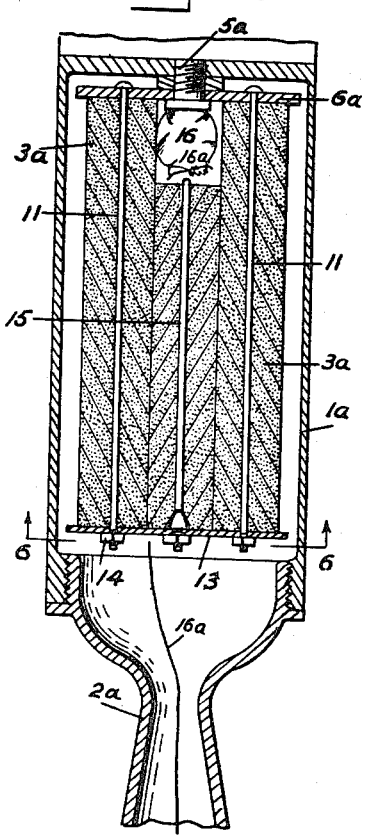
Figure 2 is a similar view of another embodiment of my invention.

In the modification of my invention shown in Figure 2 a retaining plate 6a functioning the same as plate 6 may be secured to the front face of the charge chamber 1a in the same or any convenient manner. Extending rearwardly from the retaining plate, a plurality of bolts or rods 11 engage through the perforated charge units 3a. Nuts 14 corresponding to attached heads as in the case of the nuts 8, are drawn up on the rear ends of the bolts against strap plates 12 and 13 to support and secure the charge units or sticks against the retaining plate which is shown mounted by screw 5a extended through a spacing washer and the plate and engaged in the front end of the motor chamber 1a, the latter being identical with the chamber 1 of Figure 1. From the center of the strap 13 a pin or rod 15 may be extended forwardly to secure an additional charge unit coaxial with the chamber.

Figure 3:
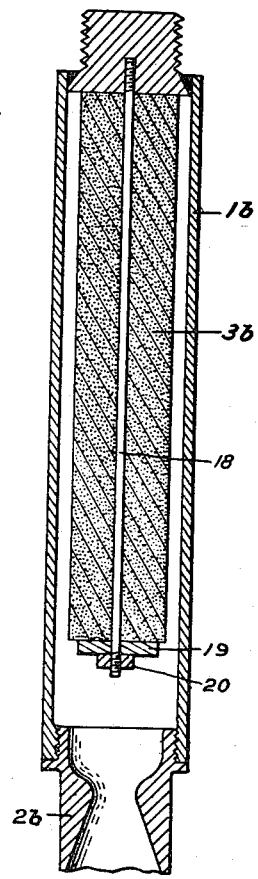
Figure 3 is a similar view of a modified form of my invention.

Figure 3 illustrates another modification of my invention in which the tubular member 1b forms the motor chamber body of a rocket in which a single charge unit 3b is secured in spaced relation to the walls of the tubular member 1b by a bolt member 18 inserted lengthwise through the charge unit, engaging the forward end of the tubular member, and having a washer 19 and nut 20 engaging the rear end of the charge unit and spacing the said rear end forwardly from the discharge tube 2b of the rocket.

In the modification of my invention shown in Figures 7 and 8 means have been provided for supporting charge units against greater acceleration forces than the embodiment shown in Fig. 1 can withstand without tearing through the charge units. In this form of the invention a charge supporting cage has been built up by welding or otherwise securing to one corner of a U-bolt 22 (such as was shown at 4 and 7 of Figures 1 and 4) an L-shaped bolt member 23 to which another L-shaped bolt has been secured. Additional L-shaped units are secured to each other successively until a cage of the desired circumference has been built up. For loading in the rocket, charge units 3c are slipped over alternate bolt members of the supporting cage, the bolts inserted through holes in the plate 6c and secured therein by nuts 8c engaging the front face of the plate, forming a unit including a cagework with the sticks of propellant thereon and then this unit inserted from the rear through the chamber 1c and secured rigidly to the forward end thereof by a stud screw 5c in the same manner that the screw 5 is shown in Figure 1. It will be apparent that by this means there will be provided a T support at the rear end of each unit, doubling the bearing surface of the bolts on the end of each charge unit during acceleration, and that more than one bolt will be provided for each charge unit to withstand the tensile stress imposed by acceleration. Thus, all the bolts or rods are so connected as to form a unitary cage or trap of which the plate 6c may be considered a part. The connection of the short arms of the L-bolts and the U-bolts as shown in Figure 7, constitute a ring device extending continuously under all the charge units.

In the modification of my invention shown in Figures 9 and 10 a supporting cage structure similar to that shown in Figs. 7 and 8 has been produced by welding or otherwise securing to a ring member 24 a plurality of threaded bolt members 25. Alternate bolt members are inserted in the perforations in the charge units 3d and the cage assembly secured to the plate 6d by any convenient means, for example by nuts drawn up on the bolts and engaging the front face of the plate. This plate is supported by a screw stud 5d in the same manner as the previously mentioned screw studs were used.

In the modification of my invention shown in Figures 11 and 12 a supporting cage structure is formed by a plurality of link members 26 each consisting of a bolt portion, an end 27 of which has been bent at right angles and formed with an eye 28. The cage is assembled by inserting the bolt portion of one link through the eye of an adjacent link successively until the desired number of charge units can be accommodated. The charge units 3e are slipped over the bolt members and the whole secured to a plate 6e by nuts or other convenient means. The plate 6e may be conveniently secured in the boly 1e by a screw stud 5e.

It will be noted that when such securing means are employed charge units may be formed to exact dimensions in automatic machinery and loaded, either in spaced relation to or in contact with the walls of the chamber by unskilled labor without affecting the uniformity of loading.

It is within the concept of my invention to secure one or more preformed charge units in the chamber by inserting through openings formed in the charge units a suspension member which may be secured to the forward wall of the chamber and has means engaging the rear surface of the charge unit. Obviously the size of the charge may be varied by loading incremental charge units upon the suspension member in end to end relationship.

Among the methods which may be utilized in igniting the charge units is that shown in my prior Patent No. 1,994,490. Another method is indicated in Figure 1 wherein a supplementary igniting charge comprising bags 21 of black or other easily ignited powder is inserted in the combustion chamber at the rear of the charge. This supplementary charge may be ignited in any convenient manner. In Figure 2, a squib 16 having electrical leads 16a leading therefrom is inserted in the space between the charge units for the ignition thereof. It will be appreciated that the screw devices 5, 5a, 5c, 5d and 5e, constitute releasable fastenings or support means fixed with the chamber and enabling the emplacement of the completely assembled charge unit by the use of a simple screw driver or the like. The plates 6—6e and assembly bolts afford a charge assembly for the rocket that permits a propellant to be made up of increment sticks of suitable contents prepared and assembled on the cage to accord with the range requirements of the immediate action or use, shortly before firing. The removal of nozzle 2 permits ready removal of the charge unit, readjustment of the content of propellant and insertion, and fastening of the cage and charge to the head of the chamber, after which the nozzle may be replaced.

In this invention there is uniformity not only by conformity to a calculated pressure curve for the sum of the driving pressures evolved but also by an absence of "standing" waves which it may be understood would be formed by pressure waves originating in opposite sides of each stick and meeting within the aperture of the stick. Such a wave would tend to fracture the propellant and/or produce irregular chamber pressures. The cross-sectional area of the bolts or rods is sufficient, and the usual materials such as steel rod stock employed for such tension members is sufficiently elastic, to afford a reflecting surface by which such opposing waves as mentioned may be reflected and the formation of standing waves prevented. The bight portions of the U-bolts, and the short arms of the L-shaped bolts, as well as the plates 12 and the annular member 24, may be regarded as constituting heads on the rod elements, their function being common with the conventional head of a bolt or the like. The ring 24 is considered a head having a plurality of shanks 25. It will be appreciated that by the connections between mutually adjacent bolts and their short arms, as shown in Figures 7 to 12 inclusive, a base ring structure is constituted which is not easily displaceable, and will preserve its concentric position in the chamber throughout combustion of the propellant charge. In the forms shown in Figures 11 and 12, the rings require a more or less rigid relation between the short arms 27 and the next adjacent bolt element by a tight fit of the eye portion 28 around the long arms 26 of the L-bolts. This is not depended upon entirely, to preserve the rigid form and certainty of position of the ring, as the securement of the upper or forward end of the bolts as described will assure the firm retention of the cage assembly in its desired position. The feature of construction of my device whereby the sticks of propellant may be secured firmly between the rear support and the forward end of the chamber is of advantage in avoiding casualties by fracture of the charge, as might occur if loose on the rods and initially spaced away from the rear end of the cage. In such a case, by the pronounced force of set-back, the improperly adjusted charge part would in some cases be thrust rearwardly with such force as to be fractured against the ring, and a large portion of the propellant ejected through the nozzle destroying the flight value of the projectile, or possibly causing bursting of the motor if the orifice should be blocked.

Also, while I have shown the U-bolts and other bolts as inserted through the plate 6, and secured by nuts, or screwed into the large plug at the forward end of Figure 3, these bolts are essentially tension rods, and may be variously secured at their forward ends in accordance with convenient practices known in the art. Where the nuts 14 and 20, etc. are shown engaged with the rear ends of the bolts or rods, for the purpose of the claims these may be considered as head members attachable to the rods and adjustable thereon and the same may be said of the nut devices shown in Figures 1 and 8 at the forward side of the plates 6 and 6c, as well as elsewhere.

For brevity in the claims the long parts of the bolts inserted through the apertured charge stick will be termed "rods," which will be understood to include bolts or other tension members whether having technical designations of a different kind or not.

The plates 6, 6a, etc., and the screw plug shown at the forward end of the device in Figure 3 may be considered equivalent to, and may be termed, a forward terminal wall of the chamber.

I claim:

1. In a rocket having a charge chamber and formed with a reduced motor nozzle orifice at the rear thereof, a charge suspending means fixed in the chamber having a rear charge engaging support end portion spaced forwardly from the orifice to establish a vacant combustion chamber of predetermined volume between the said charge and said orifice, said means comprising a tension member engaging the rear end surface of said charge and engaged through said charge and secured to a wall of said chamber other than the rearward wall thereof.

2. In a rocket driving chamber, a plurality of preformed units of driving charge composition having openings therethrough, and suspension members inserted through said openings and fixed to the forward interior wall of said chamber to support the charge units therein.

3. In a rocket driving chamber, a preformed unit of driving charge composition having an opening therethrough, and means for suspending said unit in said chamber, said means comprising a tension member engaging one end surface of said unit and engaged through said opening and anchored to the wall of said chamber at the other end of said unit.

4. In a rocket driving chamber, preformed units of charge composition having openings therethrough, and means suspending said units in said chamber, said means comprising a plate secured in the forward end of said chamber and tension members having parts thereof supportingly engaged with the rearward end surface of respective said units, said tension members engaged through said openings of said respective units and connected to said plate at the other end of said units.

5. A chambered projectile body, a plate secured in an end of said chambered body, a charge comprising units of powder having preformed openings therethrough, and means securing said charge comprising at least one tension member supportingly engaged through said units of powder through said openings and separably with the plate.

6. In a rocket driving device having a charge holding motor chamber, preformed units of charge composition each having openings therethrough, and means suspending said units in said chamber, said means comprising a plate separably and removably secured in the forward end of said chamber and rod-like tension members engaged through respective units of the charge in supporting relation to the ends of the said units, said tension members being separably anchored to said plate.

7. In a rocket driving chamber, preformed units of charge composition each having openings therethrough, and means for suspending said units in said chamber, said means comprising a plate secured in the forward end of said chamber, bolts engaging said plate and inserted through said openings, and straps engaging the rear ends of said units and secured to said bolts.

8. In a rocket driving chamber, preformed units of charge composition each having openings therethrough, and means for suspending said units in said chamber, said means comprising a plate secured in the forward end of said chamber, and a charge supporting cage, said cage comprising a U-bolt, an L-shaped bolt member having the end of its shorter leg secured to an end of the base of said U-bolt, and a plurality of L-shaped bolt members, the first having the end of its shorter leg secured to the corner of said first mentioned L-shaped member and the remainder being successively secured to each other in like manner to form a cylindrical cage, the longer legs of said bolt members being inserted through said openings and secured to said plate.

9. In a rocket driving device having a charge-holding motor chamber, preformed units of charge composition each having opening therethrough, and means suspending said units in said chamber, said means comprising a plate separably secured in the forward end of said chamber and a charge supporting cage, said cage comprising a ring member engaging the base of said charge units, and tension members secured to said ring and engaged through said openings of respective units and separably secured to said plate.

10. In a rocket driving chamber, preformed units of charge composition each having openings therethrough, and means for suspending said units in said chamber, said means comprising a plate secured in the forward end of said chamber and a plurality of bolt members secured to said plate and extending through said openings, the ends of each of the bolt members remote from said plate being turned at substantially a right angle to the charge surrounded section of said bolt member and provided with an eye encircling the adjacent bolt member at the rear end of the charge unit supported thereon.

11. In a rocket having a charge chamber and a gas discharge orifice forming an outlet from the rearward end of said chamber, means constructed and arranged for rigidly securing the charge with its rear end portion spaced from the orifice, said means comprising a tension member extending through an opening in the charge and parts thereof engaging the charge on the rearward end thereof, said tension member being secured to a wall of said chamber other than the rearward wall thereof.

12. In a rocket of the type having a charge chamber with a gas discharge orifice forming an outlet from the rearward end of said chamber, a preformed driving charge disposed in said chamber in spaced relationship to the side walls and rearward end wall of said chamber, and tension means constructed and arranged in suspension engagement with a forward wall of said chamber, and in supporting engagement with the rear end of said driving charge, and means on said tension means for drawing said charge forwardly into tight engagement of the forward end of said charge with a forward wall of said chamber, said charge and tension means being spaced forwardly from the rearward end of said chamber so as to form a vacant combustion chamber between the charge and said orifice.

13. In a rocket of the type having a charge chamber with a gas discharge orifice forming an outlet from the rearward end of said chamber, a preformed perforated driving charge disposed in said chamber in spaced relationship to the side walls and rearward end wall of said chamber, and support means comprising rods supported in said chamber and parts carried thereby engaging said charge on the rear end surface thereof, said rods extending through said perforations for substantially preventing formation of standing waves within said perforations upon firing of said rocket.

14. In a motor chamber device for rockets and the like having a rear end portion reduced and shaped to form a contracted wall and jet nozzle shaped for emission of a jet of gases with a predetermined propulsive effectiveness at a pressure calculated to initiate and maintain over a substantial projectory desired flight ballistics characteristics, and wherein the chamber is constructed with a strength capable of confining gases only at pressures not materially exceeding the effective operating pressure for the nozzle while producing said ballistic characteristics over a substantial part of the flight of the rocket, a forward terminal wall in said chamber, a cagework in said chamber comprising a plurality of tension rods and transverse charge supporting means carried at their rear extremities, a charge comprising a plurality of sticks of slow-burning propellant powder having longitudinal holes therethrough and receiving respective said rods therethrough said rods and said sticks being proportioned to sustain the maximum set-back of the charge on firing, the length of the cagework being such that an initially vacant combustion chamber space of substantial length in proportion to the rate of evolution of gases from the ignited charge is formed between the rear wall of the chamber and the said transverse support.

15. The structure of claim 14, and means to adjust the cage to hold said charge against said plate.

16. The structure of claim 14, in which the rods are of metal and are of a transverse dimension sufficient to lie across the paths of pressure waves generated within and acting toward the axes of respective sticks to act as interrupters of such waves, whereby standing waves within said sticks are prevented.

17. In a rocket motor, a charge chamber elongated in the direction of the flight axis of the projectile and having a reduced rear end forming a propulsion jet nozzle at its rear end, a cagework connected to the forward part of the chamber, and including a plurality of parallel tension members extended rearwardly and arranged in a circular series concentric with the chamber, a charge supporting annulus commonly connected with the tension members as a terminal element of the cagework, and a plurality of tubular sticks of propellant explosive of slow combustion rate having respective said tension members engaged therethrough, said annulus being positioned a distance forwardly of said nozzle to afford a vacant combustion space between the charge and said reduced rear end proportionate to given combustion and emission rates of the propellant and evolved gases.

18. The structure of claim 17 wherein the motor includes a separable plate at the forward end of the chamber having said tension members attached thereto.

19. The structure of claim 17 wherein the motor includes a removable plate at the forward end of the chamber normally fixed with the chamber, said tension members separably attached thereto.

20. As an improved article of manufacture, a charge unit for rocket motors, comprising a cagework comprising a circular series of parallel longitudinal tension members, a rear common annular explosive-supporting head carried thereby, a plurality of tubular sticks of propellant increments engaged slidably on respective said tension members, a forward transverse connecting member separably connected to all of said tension members forwardly of said increments, and means to separably connect the transverse connecting member to the forward end of a rocket motor chamber.

LESLIE A. SKINNER.

REFERENCES CITED

The following references are of record in the file of this patent:

UNITED STATES PATENTS

| Number | Name | Date |
| --- | --- | --- |
| 37,940 | Plant | Mar. 17, 1863 |
| 249,192 | Mallory | Nov. 8, 1881 |
| 826,293 | Unge | July 17, 1906 |
| 1,360,602 | Van Deuren | Nov. 30, 1920 |
| 1,440,175 | Riabouchinski | Dec. 26, 1922 |
| 2,069,794 | Woodberry | Feb. 9, 1937 |

FOREIGN PATENTS

| Number | Country | Date |
| --- | --- | --- |
| 516,865 | Great Britain | Jan. 12, 1940 |
| 395,709 | France | Jan. 5, 1909 |